Aug. 2, 1927.
J. H. IMUS
1,637,862
WEEDER
Original Filed Aug. 7, 1924   3 Sheets-Sheet 3
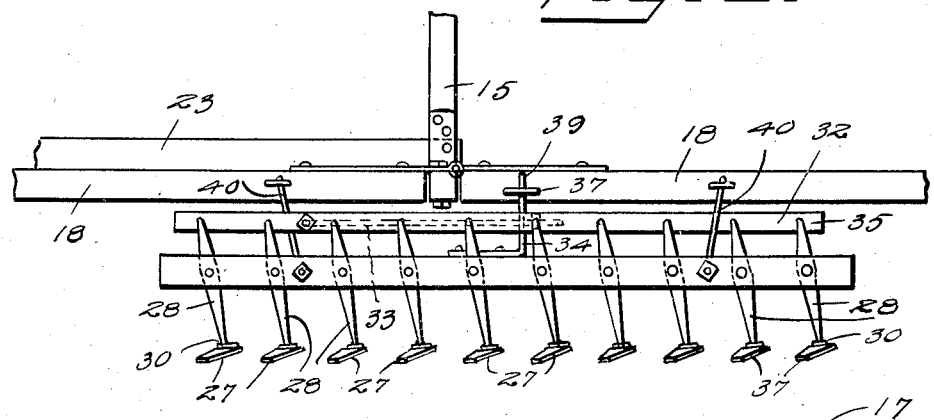
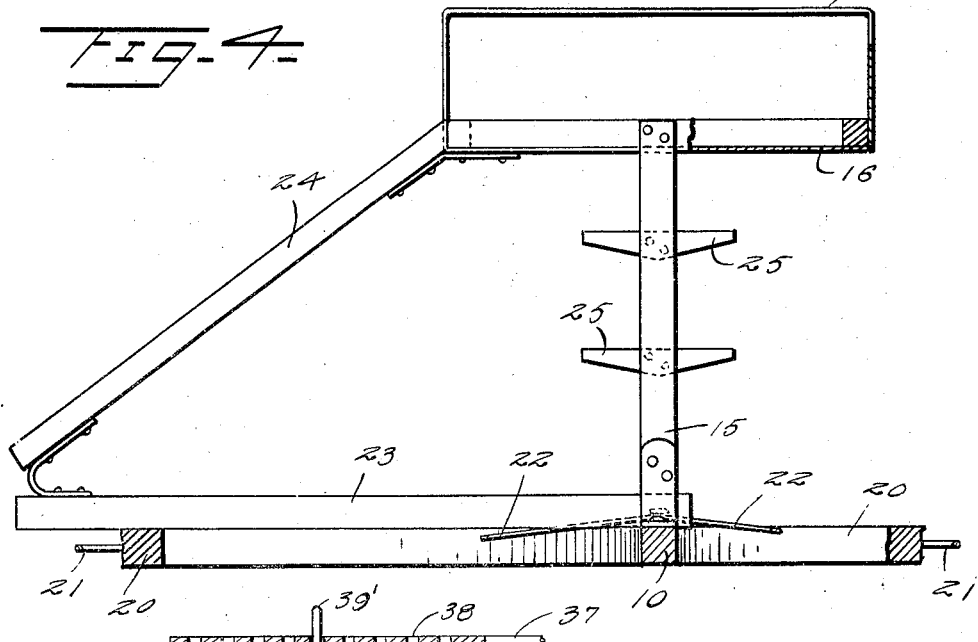
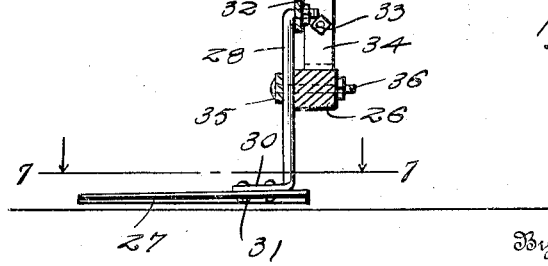
Inventor
J.H.Imus
By
Attorney Patented Aug. 2, 1927.

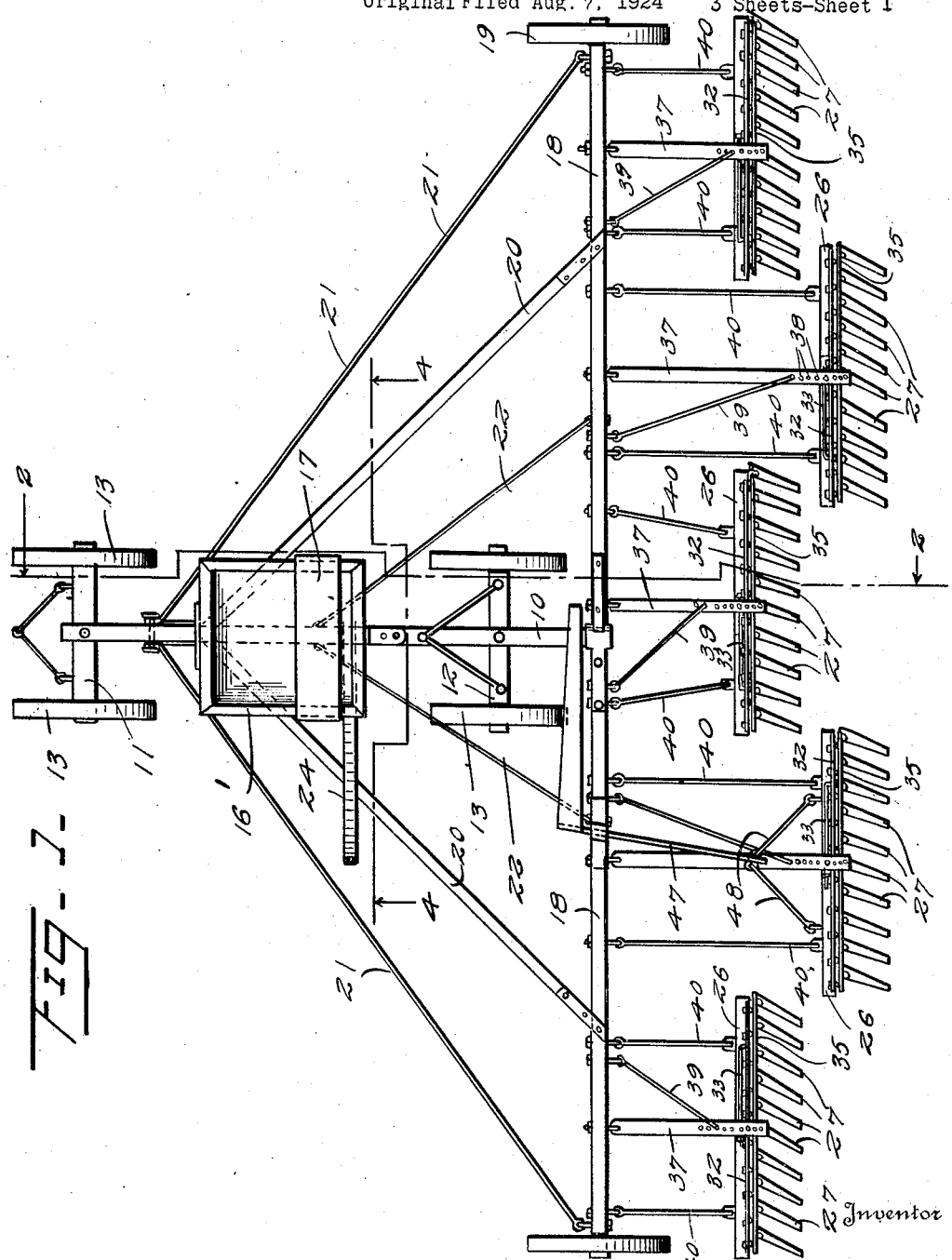

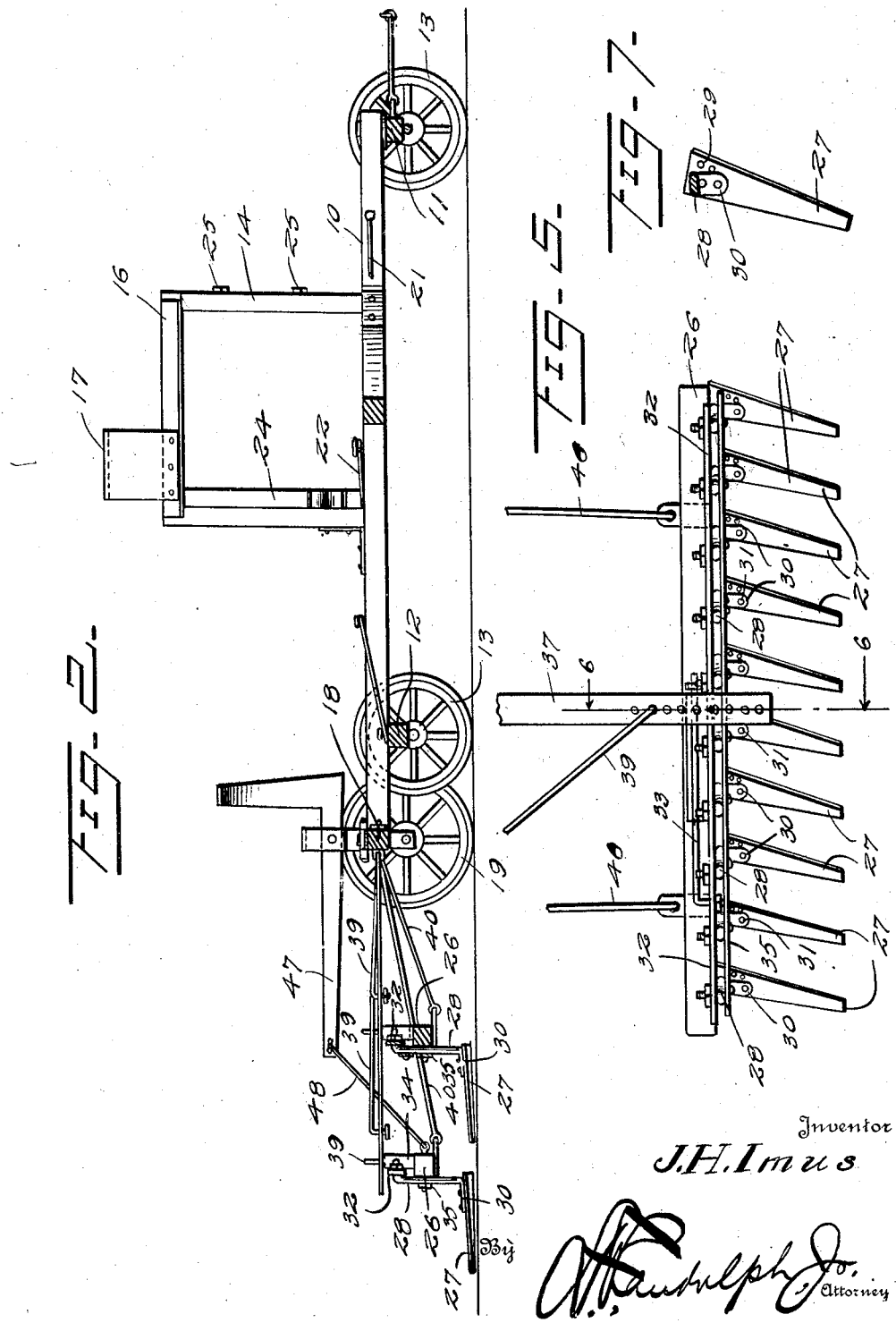

1,637,862

UNITED STATES PATENT OFFICE.

JAMES H. IMUS, OF BOARDMAN, OREGON.

WEEDER.

Application filed August 7, 1924, Serial No. 730,652. Renewed March 17, 1927.

The present invention relates to agricultural implements and provides a machine adapted chiefly to the raising of wheat utilizing a large acreage and large teams and has for its object to materially reduce the cost by a reduction in the help and in the teams usually required for the cultivation of a given area.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of a weeder embodying the invention,

Figure 2 is a vertical longitudinal sectional view on the line 2—2 of Figure 1,

Figure 3 is a rear view of a portion of the weeder showing the parts on a larger scale, Figure 4 is an enlarged sectional view on the line 4—4 of Figure 1, Figure 5 is a top plan view of a weeder section showing the part on a larger scale, Figure 6 is a detail sectional view on the line 6—6 of Figure 5, and Figure 7 is a sectional view on the line 7—7 of Figure 6.

Corresponding and like parts are referred to in the following description and designated in the several views of the drawings by like reference characters.

The implement comprises a truck to which the weeder sections and adjunctive parts are hitched, said truck as shown comprising a longitudinal bar 10, a front axle 11, and a rear axle 12, each of the axles being provided with ground wheels 13. The rear axle 12 is hitched whereas the front axle 11 is pivoted to facilitate steering. Standards 14 and 15 rise from the bar 10 and support a platform 16 to which is fitted a seat 17. Lateral bars 18 project in opposite directions from the rear end of the longitudinal bar 10 and are provided at their outer ends with ground wheels 19. Oppositely inclined braces 20 connect the outer ends of the lateral bars 18 with the front portions of the longitudinal bar 10 and stays 21 connect the outer ends of the lateral bars 18 with the front end of the bar 10. Other stays 22 connect the inner ends of the lateral bars 18 with the longitudinal bar 10. It is observed that the lateral bars 18 are stayed or braced at different points in their length so as to sustain the strain and load. A lateral stay 23 connects the longitudinal bar 10 with one of the braces 20 and a brace 24 connects the outer end of the stay 23 with the platform 16 and serves to strengthen and brace the same. Rungs 25 are attached to the standard 14 and enable the driver to mount and leave the platform 16.

A plurality of weeder sections are coupled to the lateral bars 18 and since each section and the parts coacting therewith are substantially the same, a detailed description will suffice for a clear understanding thereof. Each of the weeder sections comprises a bar or header 26, blades 27 and shanks 28, the latter being pivoted intermediate their ends to the bar 26 and adjustably connected at their lower ends to the blades 27 whereby the latter may be set to operate right or left or adjusted to any required angular position. For this purpose the blades 27 are provided with a plurality of openings 29 which are adapted to register with corresponding openings formed in the foot 30 of a shank 28, the registering openings receiving suitable fastenings 31. The lateral pitch of the blades 27 may be regulated by pivotal adjustment of the shanks 28 and this is effected by means of a strip 32 connecting the upper ends of the shanks 28 and a rod 33 connected at one end to the strip 32 and adjustably connected at its opposite end to a standard 34 rising from the bar 26. A confining strip 35 parallels the bar 26 and the shanks 28 are disposed between said confining strip and the bar 26 and the bolts 36 or other suitable fastening means pass through the strip 35, shanks 28 and bar 26 and connect said parts and form the pivot about which the shanks 28 turn. A bar 37 pivotally connected at its front end to the bar 18 has a plurality of openings 38 in its rear portion to receive the upper reduced end 39' of the standard 34, whereby adjustable connection is provided for between the weeder sections and the bar 18. A stay 39 connects the rear end of the bar 37 with the bar 18 thereby preventing lateral play of the weeder sections while at the same time providing for a limited lateral adjustment thereof. Rods 40 or analogous connections are interposed between opposite ends of the bar 26 and the bar 18 and sustain the draft.

One or both of the lateral bars 18 may be pivotally connected to the longitudinal bar 10 to admit of the outer ends of the bars 18 rising and lowering according to the nature of the ground over which the implement is drawn. This adds to the flexibility of the implement and insures the weeder sections remaining in contact with the surface of the ground even though the same may be of a rolling or hilly nature. It is further observed that the weeder sections are adapted to have an independent vertical movement because of the pivotal connection of the parts 37 and 40 with the bars 18 and 26. The weeder sections are arranged so as to overlap at their inner ends and provision is had for such arrangement by varying the length of the parts 37 and 40 as shown most clearly in Figure 1.

To clear the weeder sections of trash and accumulation that may gather it is proposed to provide means extending within convenient reach of the driver's seat to be operated for lifting the sections to dump or clear the weeds or other accumulation. Various means may be provided and as shown a lever 47 is mounted upon a bar 18 and its rear end is connected to the bar 26 by a connection 48 and the opposite end extends within convenient reach of the driver's seat to be operated without requiring the stopping of the machine and the dismounting of the driver when it is required to operate the weeder sections to clear accumulation.

What is claimed is:—

1. An agricultural implement comprising a truck, lateral bars projecting in opposite directions from the truck and hingedly connected for relative movement vertically at their outer ends, scraper members connected to said lateral bars, and adjustable laterally and movable vertically, and means connected to said members whereby the said members may be adjusted vertically to clear them of accumulation or for other required purpose.

2. In an agricultural implement of the character specified, a draft bar, a header provided with cultivator elements, draft rods connecting the draft bar and header a bar adjustably connecting the draft member with the header to admit of adjusting the pitch of the cultivator elements, a brace adjustably connecting said bar with the draft member whereby the header may be adjusted laterally.

3. In an implement of the character specified comprising a truck, lateral bars projecting in opposite directions from the truck and hingedly connected for relative movement vertically at their outer ends, a plurality of weeder sections, each comprising a header and blades, means for connecting the headers to the said lateral bars, and means for moving the headers vertically to clear them of accumulation.

In testimony whereof I affix my signature.

JAMES H. IMUS.